US008849864B2

(12) United States Patent
Malik (10) Patent No.: US 8,849,864 B2
(45) Date of Patent: Sep. 30, 2014

(54) DIGITAL ARCHIVE SYSTEMS, METHODS AND COMPUTER PROGRAM PRODUCTS FOR LINKING LINKED FILES

(75) Inventor: Dale Malik, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1102 days.

(21) Appl. No.: 11/550,175

(22) Filed: Oct. 17, 2006

(65) Prior Publication Data

US 2008/0091745 A1    Apr. 17, 2008

(51) Int. Cl.
*G06F 17/30* (2006.01)

(52) U.S. Cl.
CPC .............................. *G06F 17/30067* (2013.01)
USPC ........................ 707/796; 707/805; 707/823

(58) Field of Classification Search
CPC ................................................ G06F 17/30067
USPC ................... 707/796, 805, 823; 715/206, 208
See application file for complete search history.

(56) References Cited

U.S. PATENT DOCUMENTS

| | | | | |
|---|---|---|---|---|
| 6,035,323 | A * | 3/2000 | Narayen et al. | 709/201 |
| 6,189,018 | B1 * | 2/2001 | Newman et al. | 715/205 |
| 5,872,923 | A1 * | 10/2001 | Yang et al. | 707/104.1 |
| 6,301,586 | B1 * | 10/2001 | Yang et al. | 707/104.1 |
| 6,763,182 | B1 * | 7/2004 | Endo et al. | 386/124 |
| 6,856,348 | B1 * | 2/2005 | Okada | 348/231.2 |
| 6,871,147 | B2 * | 3/2005 | Schlager et al. | 702/19 |
| 7,027,172 | B1 * | 4/2006 | Parulski et al. | 358/1.15 |
| 7,039,753 | B2 * | 5/2006 | Suzuki et al. | 711/102 |
| 7,249,315 | B2 * | 7/2007 | Moetteli | 707/E17.111 |
| 7,284,040 | B2 * | 10/2007 | Kobayashi et al. | 709/219 |
| 2002/0035697 | A1 * | 3/2002 | McCurdy et al. | 713/200 |
| 2002/0091836 | A1 * | 7/2002 | Moetteli | 709/227 |
| 2003/0097351 | A1 * | 5/2003 | Rothschild et al. | 707/1 |
| 2003/0101255 | A1 * | 5/2003 | Green | 709/223 |
| 2003/0124527 | A1 * | 7/2003 | Schlager et al. | 435/6 |
| 2003/0151621 | A1 * | 8/2003 | McEvilly et al. | 345/744 |
| 2004/0125124 | A1 * | 7/2004 | Kim et al. | 345/716 |
| 2004/0153456 | A1 * | 8/2004 | Charnock et al. | 707/10 |
| 2004/0177319 | A1 * | 9/2004 | Horn | 715/501.1 |

(Continued)

FOREIGN PATENT DOCUMENTS

| | | | | |
|---|---|---|---|---|
| EP | | 1094407 A2 * | 4/2001 | ............. G06F 17/30 |
| WO | WO 2007070676 A2 * | 6/2007 | | |
| WO | WO 2007076150 A2 * | 7/2007 | | |

OTHER PUBLICATIONS

Jeida, "Design rule for Camera File system", Version 1.0, Dec. 1998, Japan Electronic Industry Development Association Standard, p. 1-39.*

(Continued)

*Primary Examiner* — Shew-Fen Lin
(74) *Attorney, Agent, or Firm* — Myers Bigel Sibley & Sajovec (57) ABSTRACT

A digital archive system includes a plurality of digital files and a user interface that allows a user to designate any one of the files as an anchor file and to link other ones of the files to a designated anchor file. The user interface allows a user to annotate each file linked to an anchor file with information describing the respective file and any relationship between the anchor file and the respective linked file. The content of an anchor file and all files linked thereto can be displayed via the user interface.

9 Claims, 4 Drawing Sheets

(56) References Cited

U.S. PATENT DOCUMENTS

| | | | |
|---|---|---|---|
| 2005/0010583 A1* | 1/2005 | Clifton-Bligh | 707/100 |
| 2005/0160167 A1* | 7/2005 | Cheng et al. | 709/224 |
| 2005/0235062 A1* | 10/2005 | Lunt et al. | 709/225 |
| 2005/0237391 A1* | 10/2005 | Shibuya et al. | 348/207.1 |
| 2006/0069699 A1* | 3/2006 | Smadja et al. | 707/104.1 |
| 2006/0069926 A1* | 3/2006 | Ginter et al. | 713/194 |
| 2006/0282440 A1* | 12/2006 | Fletcher et al. | 707/100 |
| 2007/0074078 A1* | 3/2007 | Potts | 714/38 |
| 2007/0150368 A1* | 6/2007 | Arora et al. | 705/26 |

OTHER PUBLICATIONS

Nikon, "Nikon Companion Software for COOLPIX Digital Cameras Nikon View Ver. 2 for Macintosh Reference Manual", Mar. 19, 1999, p. 1-39.*

Barry, "Story Beads: A wearable for distributed and mobile storytelling", Aug. 31, 2000, MS Thesis, 69 pages, <Retrieved from Google Scholar and internet May 23, 2009>.*

Van House, "The Uses of Personal Networked Digital Imaging: An Empirical Study of Cameraphone Photos and Sharing", Apr. 2005, CHI 2005, ACM Press, p. 1853-1856, <Retrieved from ACM Portal May 23, 2009>.*

Vandenbussche, "Analysis, Design and Implementation of a framework that reconciles social bookmarking with Semantic Web annotation", Aug. 2006, Vrije Universiteit Brussel, <Retrieved from Google Scholar and internet May 23, 2009>.*

Ito, "Intimate Visual Co-Presence", Feb. 2005, <Retrieved from http://www.itofisher.com/mito/archives/ito.ubicomp05.pdf on May 23, 2009>.*

Jaimes, "Human Factors in Automatic Image Retrieval System Design and Evaluation", Jan. 2006, in IS&T/SPIE Proceedings of SPIE vol. #6061, Internet Imaging VII, San Jose, CA, USA, <Retrieved from internet May 23, 2009>.*

Kustanwitz, "Motivating Annotation for Personal Digital Photo Libraries: Lowering Barriers While Raising Incentives", 2005, cs.umd.edu, 10 pages, <Retrieved from cs.umd.edu May 23, 2009>.*

Weitlaner, "Metadata Visualisation Visual Exploration of File Systems and Search Result Sets based on Metadata Attributes", Dec. 1999, Master's Thesis at Graz Univ. of Technology, <Retrieved from Google Scholar internet May 23, 2009>.*

Barthelmess et al, "Collaborative Multimodal Photo Annotation over Digital Paper", Nov. 2006, ICMI'06, ACM Press, p. 4-11 (repaginated), <Retrieved from ACM May 23, 2009>.*

* cited by examiner

DIGITAL ARCHIVE SYSTEMS, METHODS AND COMPUTER PROGRAM PRODUCTS FOR LINKING LINKED FILES

FIELD OF THE INVENTION

The present invention relates generally to archives and, more particularly, to digital archives.

BACKGROUND OF THE INVENTION

The practice of maintaining scrapbooks or albums in which there are deposited keepsakes such as letters, clippings and photographs has been practiced for generations. Many people maintain albums and/or boxes in which they retain mementos which they value for one reason or another. Very often scrapbooks are maintained which include a collection of photographs, articles, and other mementos having particular sentimental value to the owner. The nature of these collections is that they may grow steadily, event by event, year by year, and may become large and difficult to manage. Such is the case with more recent digital scrapbooks within which people maintain digital mementos, including images, audio files, video files, and text. In addition, as memories fade over time, details about various items in a scrapbook (both digital and non-digital) and interrelationships between items can become lost.

SUMMARY OF THE INVENTION

According to some embodiments of the present invention, a digital archive system includes a plurality of digital files (e.g., image files, audio files, video files, text files, and/or various combinations thereof, etc.), and a user interface that allows a user to designate any one of the files as an anchor file and to link other ones of the files to a designated anchor file. The user interface allows a user to annotate each file linked to an anchor file with information describing the respective file and any relationship between the anchor file and the respective linked file. The content of an anchor file and all files linked thereto can be displayed via the user interface.

According to some embodiments of the present invention, a digital archive user interface may be configured to allow a user to filter files linked to an anchor file by file type. For example, a user can elect to display only linked image files, only linked audio files, only linked text files, only linked video files, and/or only some combination of files.

According to some embodiments of the present invention, a digital archive user interface may be configured to present a user with various types of information regarding one or more files linked to an anchor file and/or to an anchor file within a digital archive. Exemplary information includes, but is not limited to, the identification of users who have linked files to an anchor file in a digital archive, the identification of files linked to an anchor file in a digital archive, the identification of files linked to a file that is linked to an anchor file in a digital archive, and the identification of other digital archives with which a linked file is associated.

According to some embodiments of the present invention, a digital archive user interface may be configured to allow a user to search the annotations of files linked to an anchor file. Annotation information may include such things as a title for the file, who created the file, when the file was created, the relationship of the file to an anchor file, etc.

According to some embodiments of the present invention, a digital archive user interface may be configured to allow a user to designate various rights regarding an anchor file and files linked thereto. For example, a user can grant access rights to selected users that allow the selected users to link other files to an anchor file. In addition, a user can assign privacy rights to files linked to an anchor file, wherein the privacy rights specify who can access a file linked to an anchor file. Also, a user can assign privacy rights to files linked to an anchor file, wherein the privacy rights specify who can access files associated with a file linked to an anchor file.

According to some embodiments of the present invention, a method of linking files in a digital archive includes designating a first file as an anchor file, wherein the anchor file is selected from the group consisting of image files, audio files, video files, and text files; linking a second file to the designated anchor file; and annotating the second file with information describing the second file and any relationship between the anchor file and the second file. The content of an anchor file is displayed within a user interface along with files linked thereto. The linked files may be listed and/or their contents displayed, as well.

Other digital archive systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF EMBODIMENTS OF THE INVENTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, or communicate the program for use by or in connection with the instruction execution system, apparatus, or device.

The computer-usable or computer-readable medium may be, for example but not limited to, an electronic, magnetic, optical, electromagnetic, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

As used herein, the term "displaying content" means displaying the content of any type of file, without limitation. For example, "displaying content" includes displaying an image of an image file, displaying text of a text file, audibly playing an audio file, audio-visually playing a video file, etc.

Computer program code for carrying out operations of data processing systems discussed herein may be written in a high-level programming language, such as Java, AJAX (Asynchronous JavaScript), C, and/or C++, for development convenience. In addition, computer program code for carrying out operations of embodiments of the present invention may also be written in other programming languages, such as, but not limited to, interpreted languages. Some modules or routines may be written in assembly language or even microcode to enhance performance and/or memory usage. Embodiments of the present invention are not limited to a particular programming language. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for linking files in a digital archive, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 1:
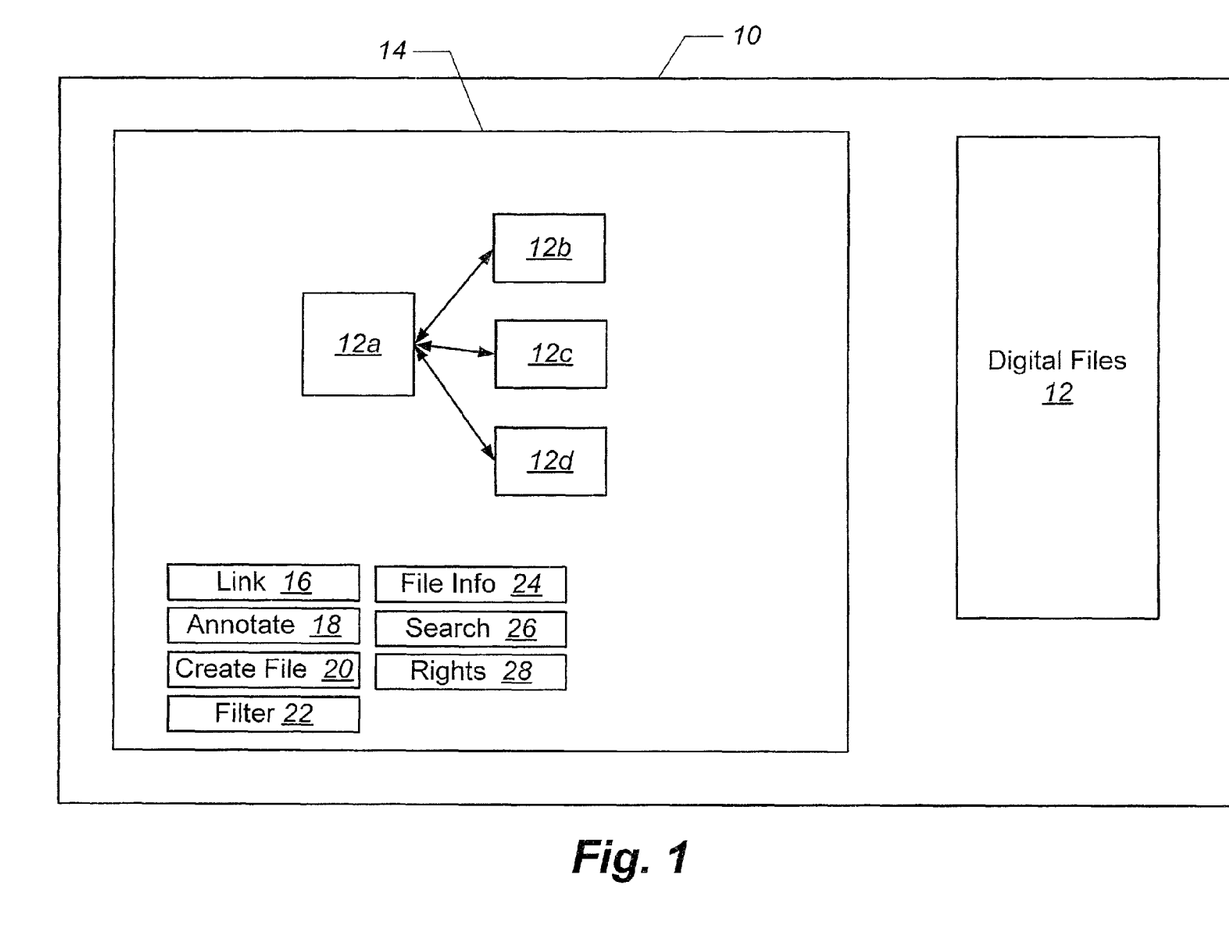
FIG. 1 is a block diagram that illustrates a digital archive, according to some embodiments of the present invention.

Referring now to FIG. 1, a digital archive 10, according to embodiments of the present invention, will be described. The illustrated digital archive 10 includes a plurality of digital files (e.g., image files, audio files, video files, and text files, etc.) generally indicated as 12. Each digital file 12 may be locally stored or may be remotely stored but accessible via the digital archive 10. The illustrated digital archive 10 also includes a user interface 14 that is configured to display one or more of the digital files 12 and that is configured to allow users to link one or more of the digital files 12 together as described below.

The user interface 14 is configured to allow a user to designate any one of the digital files 12 as an anchor file, to allow a user to link other digital files to a designated anchor file, and to allow a user to annotate each file linked to an anchor file with information describing the respective file and any relationship between the anchor file and the respective linked file. The user interface 14 is configured to display the content of an anchor file and all files linked thereto.

In FIG. 1, digital file 12a has been designated as an anchor file by a user. GUI control 16 is configured to allow a user to link other files to the anchor file 12a. GUI control 18 is configured to allow a user to annotate linked files. As used herein, the term "annotate" means that a user can provide a title and/or other information for a linked file, and can describe a relationship between the linked file and the anchor file, etc.

GUI control 20 is configured to allow a user to create a file to be linked to the designated anchor file 12a. For example, a user may wish to create an audio file that contains audio information that the user wishes to link to the anchor file 12a. Via GUI control 20, the user can create the audio file and then can link the newly created audio file to the anchor file 12a.

GUI control 22 is configured to allow a user to filter files linked to an anchor file by file type. For example, when an anchor file is displayed, the user may wish to only display linked files that are image files. Via GUI control 22, the user can designate that only image files are displayed with an anchor file, for example.

GUI control 24 is configured to allow a user to obtain various types of information regarding one or more files linked to an anchor file. For example, according to some embodiments of the present invention, GUI control 24 may be configured to allow a user to identify all users who have linked files to an anchor file. GUI control 24 may be configured to allow a user to identify all files linked to an anchor file. GUI control 24 may be configured to allow a user to identify all files linked to a file that is linked to an anchor file. In other words, GUI control 24 may be configured to allow a user to determine what other files are linked to a particular linked file. GUI control 24 may be configured to allow a user to identify what other digital archives a linked file is associated with.

GUI control 26 is configured to allow a user to search the annotation(s) of each file linked to an anchor file. As described above, each linked file may be provided with an annotation that includes various types of information about the file. Annotation information may include such things as a title for the file, who created the file, when the file was created, what is the relationship of the file to an anchor file, etc. Thus, for example, GUI control 26 may enable a user to locate all files linked to an anchor file that relate to a user's grandparents and/or that were created prior to 1995.

GUI control 28 is configured to allow a user to designate various rights regarding an anchor file and files linked thereto. For example, according to some embodiments of the present invention, GUI control 28 allows a user to grant access rights to selected users that allow the selected users to link other files to an anchor file (e.g., anchor file 12a). According to some embodiments of the present invention, GUI control 28 may be configured to allow a user to assign privacy rights to files linked to an anchor file, wherein the privacy rights specify who can access a file linked to an anchor file. According to some embodiments of the present invention, GUI control 28 may be configured to allow a user to assign privacy rights to files linked to an anchor file, wherein the privacy rights specify who can access files associated with a file linked to an anchor file.

A digital archive according to embodiments of the present invention is not required to have a user interface with all of the above-described features. For example, a user interface may include fewer GUI controls or more GUI controls than illustrated in FIG. 1. Moreover, one or more of the various functions described above may be performed in other ways in lieu of the use of GUI controls. For example, a user interface according to some embodiments of the present invention may include menus that perform one or more of the above-described functions. In addition, files displayed within an user interface according to some embodiments may be configured to be "clickable" by a user in order to initiate one or more of the above-described functions (e.g., a displayed file is configured such that a user may position a mouse pointer over the displayed file and press a mouse button to initiate certain functions).

Exemplary operations for linking files in a digital archive, according to some embodiments of the present invention, will now be described with reference to FIG. 2. Initially, a file is designated as an anchor file (Block 100), and one or more other files are linked to the designated anchor file (Block 110). Each linked file is annotated with, for example, information describing the linked file(s) and any relationship between the anchor file and the linked file(s) (Block 120). The content of an anchor file is displayed within a user interface along with files linked to the anchor file (Block 130). The display of linked files may include the display of the content of the linked files and/or the display of a list of the linked files within the user interface.

According to some embodiments of the present invention, access may be granted to other persons to link files to an anchor file or to any other files in the digital archive (Block 140). The owner of a digital archive may want to allow others to link files to one or more files within the owner's digital archive. For example, referring to FIG. 4, the linking of files in two separate digital archives 300, 400 is illustrated. In Jill's archive 300, an anchor file 302, which happens to be an image of Jill, is linked to the various content files in Jill's archive 300 (this is represented by links to a group of content files entitled "Welcome to My Summer Vacations" 304 and to other content files 308). Within "Welcome to My Summer Vacations" 304 are images organized by year (1976-1978). Under 1977 is a subdirectory entitled "Pictures of Friends" and in this subdirectory is an image of John and David 306.

Figure 4:
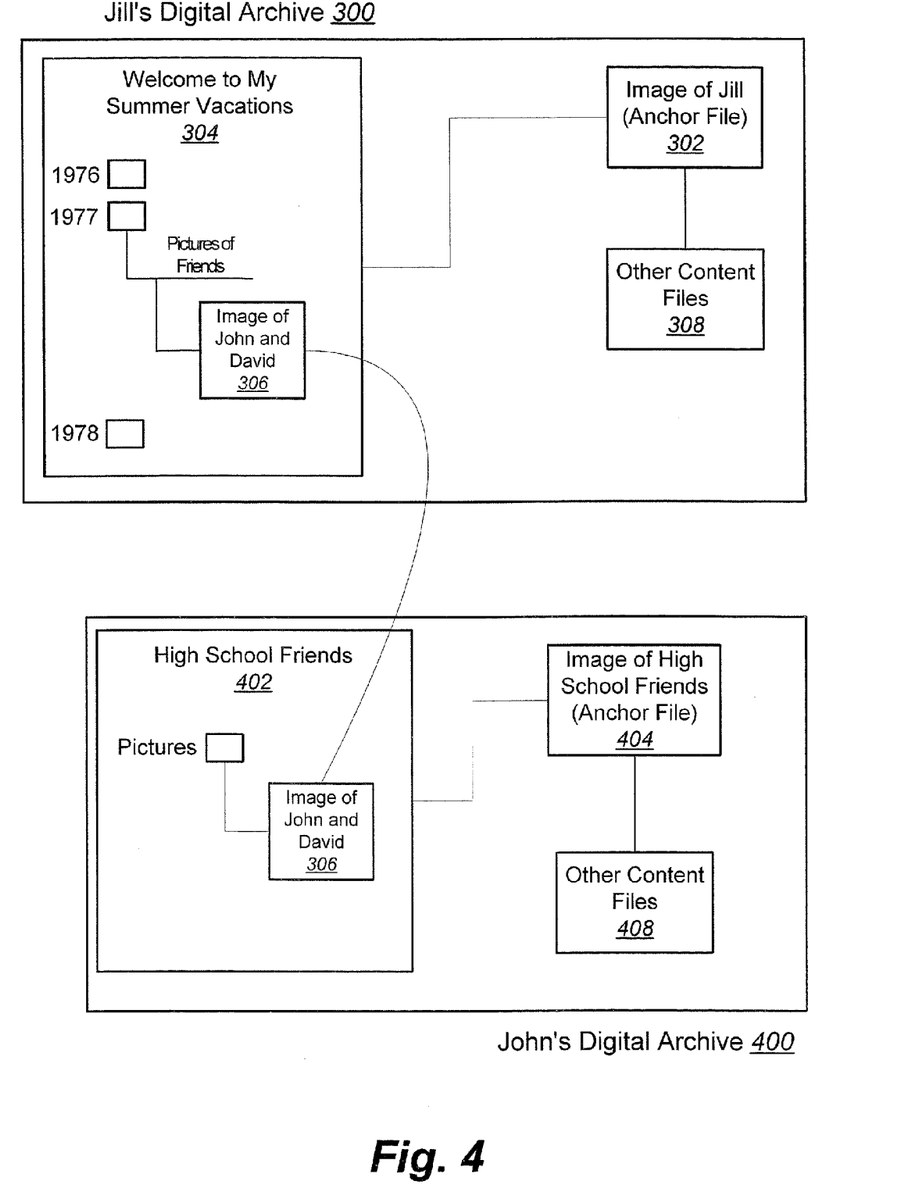
FIG. 4 is a block diagram that illustrates a link between files in different digital archives, according to some embodiments of the present invention.

In John's archive 400, an anchor file 404, which happens to be an image of high school friends, is linked to the various content files in John's archive 400 (this is represented by links to "High School Friends" 402 and to other content files 408). In "High School Friends" 402, the image of John and David 306 is also located. As such, there is a link between the two images of John and David which creates a link between Jill's archive 300 and John's archive 400.

When a user touches (e.g., clicks, "mouse overs", etc.) the image of John and David 306 in either Jill's archive 300 or John's archive 400, the user would see whatever paths existed between the two archives and whatever paths to content files existed in the respective archives. For example, if the user touches the image of John and David 306 in Jill's archive 300, the user would see the content files of "Welcome to My Summer Vacations" 304 and other content files linked to by the anchor file 302, assuming rights and permissions to view these content files is granted. The user would also see content files in John's archive 400, depending upon what rights and permissions are granted by John. Similarly, if the user touches the image of John and David 306 in John's archive 300, the user would see the content files of "High School Friends" 402 and the other content files linked to by the anchor file 404, assuming rights and permissions to view these content files is granted. The user would also see content files in Jill's archive 300, depending upon what rights and permissions are granted by Jill.

According to some embodiments of the present invention, if Jill sends the image of John and David 306 to a third party, the image would be accompanied by whatever rights and permissions Jill is willing to grant to the third party with respect to the content files in Jill's archive 300. Thus, the third party would be able to view the content files in Jill's archive 300 for which rights and permission were provided by Jill. In addition, the third party would be able to see other links to the received image (i.e., the link to John's archive 400).

According to some embodiments of the present invention, privacy rights may be assigned to one or more files within a digital archive (Block 150). For example, the owner of a digital archive may assign privacy rights to files linked to an anchor file. The privacy rights may specify who can access a file linked to an anchor file, and/or may specify who can access an anchored file. This feature allows others to view files within the owner's digital archive.

Figure 3:
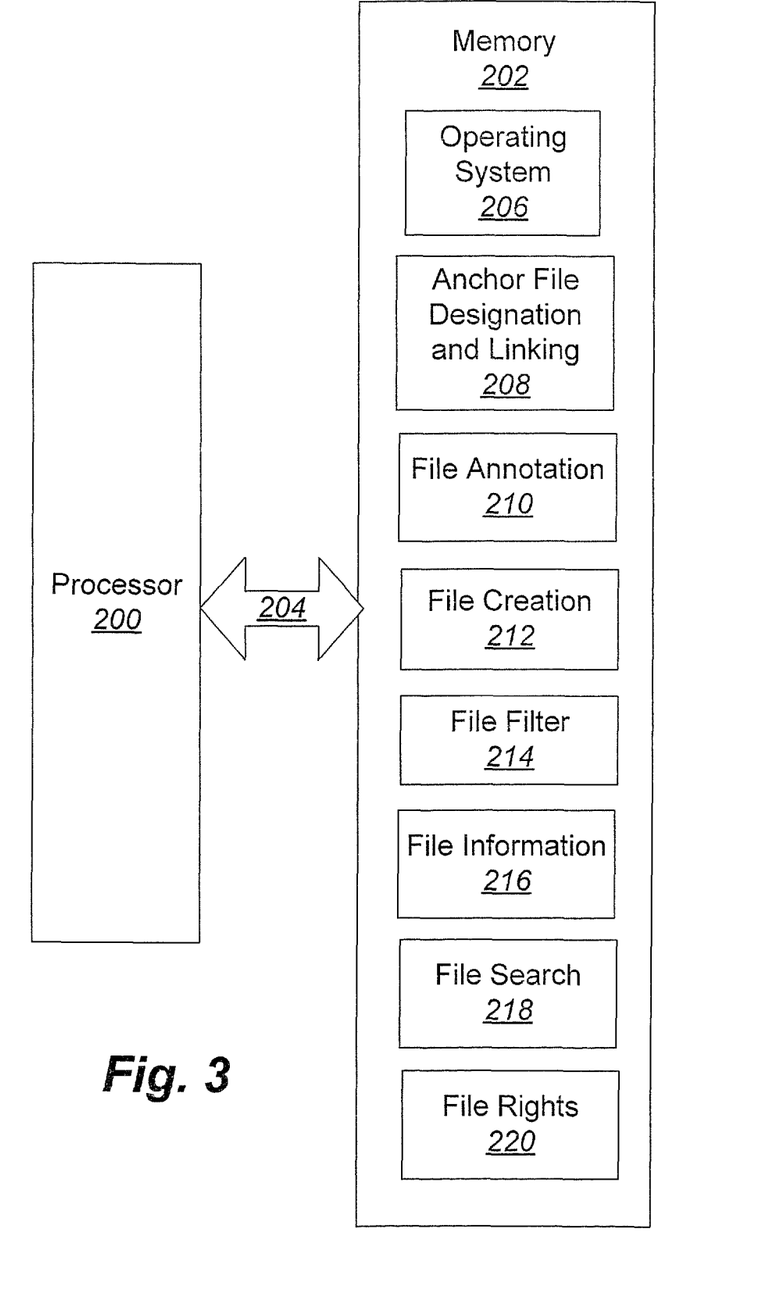
FIG. 3 is a block diagram that illustrates a processor and a memory hosted by a device that may be used to implement a digital archive, according to some embodiments of the present invention.

FIG. 3 illustrates a processor 200 and a memory 202 hosted by a device that may be used in embodiments of systems, methods, and computer program products for a digital archive and for linking files in a digital archive, according to some embodiments of the present invention. The processor 200 communicates with the memory 202 via an address/data bus 204. The processor 200 may be, for example, a commercially available or custom microprocessor. The memory 202 is representative of the overall hierarchy of memory devices containing the software and data used to implement a digital archive and link files therein as described herein, in accordance with some embodiments of the present invention. The memory 202 may include, but is not limited to, the following types of devices: cache, ROM, PROM, EPROM, EEPROM, flash, SRAM, and DRAM.

As shown in FIG. 3, the memory 202 may hold various categories of software and data: an operating system 206, anchor file designation and linking application 208, file annotation application 210, file creation application 212, file filter application 214, file information application 216, file search application 218, and file rights application 220. The operating system 206 controls operations of one or more devices utilized to implement a digital archive. In particular, the operating system 206 may manage a device's resources and may coordinate execution of various programs (e.g., the anchor file designation and linking application, file annotation application, file creation application, file filter application, file information application, file search application, file rights application, etc.) by the processor 200.

The anchor file designation and linking application 208 comprises logic for designating a file as an anchor file and for linking other files to the designated anchor file within a digital archive. The file annotation application 210 comprises logic for allowing a user to provide a title and/or other information for a linked file. Moreover, via the file annotation application 210 a user can describe a relationship between a linked file and an anchor file.

The file creation application 212 comprises logic for creating files to be linked to designated anchor files. The file filter application 214 comprises logic for filtering files linked to an anchor file by file type. When invoked by a user, for example, the file filter application 214 allows a user to display only linked image files, only linked audio files, only linked text files, only linked video files, and/or only some combination of such files, etc.

The file information application 216 comprises logic for presenting a user with various types of information regarding one or more files linked to an anchor file and/or to an anchor file within a digital archive. Exemplary information includes, but is not limited to, the identification of users who have linked files to an anchor file in a digital archive, the identification of files linked to an anchor file in a digital archive, the identification of files linked to a file that is linked to an anchor file in a digital archive, and the identification of other digital archives a linked file is associated with.

The file search application 218 comprises logic for searching the annotations of files linked to an anchor file. As described above, each linked file may be provided with an annotation that includes various types of information about the file. Annotation information may include such things as a title for the file, who created the file, when the file was created, what is the relationship of the file to an anchor file, etc.

The file rights application 220 comprises logic for designating various rights regarding an anchor file and files linked thereto. For example, via the file rights application 220, a user can grant access rights to selected users that allow the selected users to link other files to an anchor file. In addition, via the file rights application 220, a user can assign privacy rights to files linked to an anchor file, wherein the privacy rights specify who can access a file linked to an anchor file. Via the file rights application 220, a user can assign privacy rights to files linked to an anchor file, wherein the privacy rights specify who can access files associated with a file linked to an anchor file.

Figure 2:
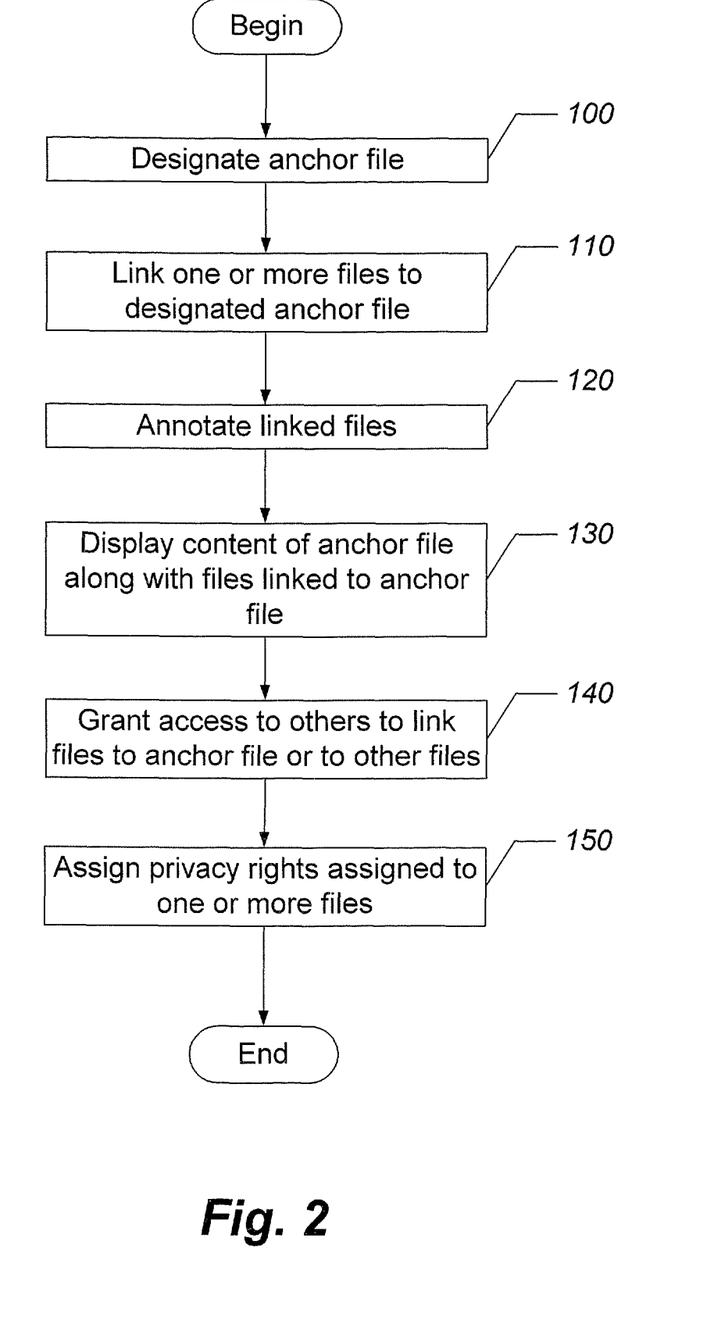
FIG. 2 is a flow chart that illustrates exemplary operations for linking files in a digital archive, according to some embodiments of the present invention.

FIGS. 1-3 illustrate the architecture, functionality, and operations of some embodiments of digital archive systems, methods, and computer program products for allowing users to link files together. In this regard, each block represents a module, segment, or portion of code, which comprises one or more executable instructions for implementing the specified logical function(s). It should also be noted that in other implementations, the function(s) noted in the blocks may occur out of the order noted in FIG. 2. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

That which is claimed:

1. A digital archive system, comprising:
a user interface;
a processor; and
a memory storing instructions that when executed by the processor cause the processor to perform operations comprising:
designating, via the user interface, any one of a plurality of digital content files within the digital archive system as an anchor file, wherein the plurality of digital content files are selected from a group consisting of image files, audio files, video files, and text files;
linking, via the user interface, other ones of the digital content files within the digital archive system to the anchor file, wherein each digital content file linked to the anchor file creates a respective path that can be illustrated graphically as a line;
linking, via the user interface, one of the digital content files in the digital archive system to another digital content file in another digital archive system, wherein each of the digital content files in the digital archive system linked to a digital content file in the another digital archive system creates a respective path that can be illustrated graphically as a line;
annotating, via the user interface, each of the other ones of the digital content files linked to the anchor file within the digital archive system with information describing the respective other ones of the digital content files and any relationship between the anchor file and the respective other ones of the digital content files;
displaying, via the user interface, content of the anchor file, all of the other ones of the digital content files linked to the anchor file, and files in the another digital archive system in response to a mouse over of the one of the digital content files in the digital archive system;
graphically displaying, via the user interface, lines representative of paths existing between the digital content files in the digital archive system and the another digital archive system and lines representative of paths existing between the digital content files within each of the digital archive system and the another digital archive system; and
granting access to selected users to link the other ones of the digital content files to the anchor file.

2. The digital archive system of claim 1, wherein displaying content of the anchor file and all of the other ones of the digital content files linked thereto comprises filtering files by file type.

3. The digital archive system of claim 1, wherein linking the other ones of the digital content files to the anchor file comprises creating a digital content file to be linked to the anchor file.

4. The digital archive system of claim 1, wherein the operations further comprise identifying users who have linked digital content files to the anchor file.

5. The digital archive system of claim 1, wherein the operations further comprise identifying the other ones of the digital content files linked to the anchor file.

6. The digital archive system of claim 1, wherein the operations further comprise identifying a digital content file associated with the other ones of the digital content files linked to the anchor file.

7. The digital archive system of claim 1, wherein the operations further comprise searching annotations of each of the other ones of the digital content file linked to the anchor file.

8. The digital archive system of claim 1, wherein the operations further comprise assigning privacy rights to the other ones of the digital content files linked to the anchor file, wherein the privacy rights specify who can access respective ones of the other ones of the digital content file linked to the anchor file.

9. The digital archive system of claim 1, wherein the operations further comprise assigning privacy rights to the other ones of the digital content files linked to the anchor file, wherein the privacy rights specify who can access a digital content file associated with respective ones of the other ones of the digital content file linked to the anchor file.

* * * * *